US012781757B2

(12) United States Patent
Buthmann et al.

(10) Patent No.: US 12,781,757 B2
(45) Date of Patent: Nov. 3, 2026

(54) CENTRIFUGAL PUMP HAVING A COOLING INSERT

(71) Applicant: KSB SE & Co. KGaA, Frankenthal (DE)

(72) Inventors: Lukas Buthmann, Frankenthal (DE); Rudolf Ens, Frankenthal (DE); Tobias Froeba, Frankenthal (DE); Florian Kober, Frankenthal (DE)

(73) Assignee: KSB SE & Co KGaA, Frankenthal (DE)

( * ) Notice: Subject to any disclaimer, the term of this patent is extended or adjusted under 35 U.S.C. 154(b) by 0 days.

(21) Appl. No.: 18/710,259

(22) PCT Filed: Nov. 8, 2022

(86) PCT No.: PCT/EP2022/081058

§ 371 (c)(1),
(2) Date: May 15, 2024

(87) PCT Pub. No.: WO2023/083777

PCT Pub. Date: May 19, 2023

(65) Prior Publication Data

US 2025/0003417 A1 Jan. 2, 2025

(30) Foreign Application Priority Data

Nov. 15, 2021 (DE) ..................... 10 2021 129 695.1

(51) Int. Cl.
*F04D 29/10* (2006.01)
*F04D 1/00* (2006.01)
(Continued)

(52) U.S. Cl.
CPC ............. *F04D 29/106* (2013.01); *F04D 1/00* (2013.01); *F04D 7/06* (2013.01); *F04D 29/586* (2013.01); *F16J 15/3284* (2013.01)

(58) Field of Classification Search
CPC .......... F04D 7/06; F04D 7/065; F04D 29/128; F04D 29/04; F04D 29/106; F16J 15/324; F16J 15/3404
See application file for complete search history.

(56) References Cited

U.S. PATENT DOCUMENTS

| | | | | |
|---|---|---|---|---|
| 5,125,792 A | 6/1992 | Korenblit | | |
| 8,870,521 B2 * | 10/2014 | Brecht | ............... | F04D 29/5893 415/206 |

(Continued)

FOREIGN PATENT DOCUMENTS

| | | |
|---|---|---|
| DE | 199 28 141 A1 | 12/2000 |
| DE | 10 2017 209 803 A1 | 12/2018 |

(Continued)

OTHER PUBLICATIONS

International Search Report (PCT/ISA/210) issued in PCT Application No. PCT/EP2022/081058 dated Feb. 20, 2023 with English translation (6 pages).

(Continued)

*Primary Examiner* — Brian P Wolcott
(74) *Attorney, Agent, or Firm* — Crowell & Moring LLP

(57) ABSTRACT

A centrifugal pump includes a shaft arrangement and a cooling insert. The shaft sealing arrangement includes a rotating element and a stationary element, which form a sealing gap associated with a lubricating film in a chamber. The cooling insert has a first region and a second region. The first region at least partially surrounds the rotating element. The second region at least partially delimits the chamber.

11 Claims, 6 Drawing Sheets

(51) Int. Cl.

| | |
|---|---|
| ***F04D 7/06*** | (2006.01) |
| ***F04D 29/58*** | (2006.01) |
| ***F16J 15/3284*** | (2016.01) |

(56) References Cited

U.S. PATENT DOCUMENTS

| | | | | |
|---|---|---|---|---|
| 10,557,474 | B2 * | 2/2020 | Gassmann .......... | F04D 29/5873 |
| 2015/0083370 | A1 * | 3/2015 | Nebout .................. | F16J 15/064<br>165/104.19 |
| 2016/0348687 | A1 | 12/2016 | Gassmann et al. | |
| 2018/0209545 | A1 * | 7/2018 | Leal ..................... | F16J 15/3284 |

FOREIGN PATENT DOCUMENTS

| | | | | | |
|---|---|---|---|---|---|
| EP | 1 134 424 | B1 | | 10/2008 | |
| GB | 1301309 | A | * | 12/1972 | |
| GB | 2 106 593 | A | | 4/1983 | |
| GB | 2106593 | | * | 4/1983 | ........... F04D 29/128 |
| JP | 58-57096 | A | | 4/1983 | |

OTHER PUBLICATIONS

German-language Written Opinion (PCT/ISA/237) issued in PCT Application No. PCT/EP2022/081058 dated Feb. 20, 2023 with English translation (9 pages).
Japanese-language Office Action issued in Japanese Application No. 2024-529224 dated Aug. 28, 2026 (7 pages).

* cited by examiner

CENTRIFUGAL PUMP HAVING A COOLING INSERT

CROSS REFERENCE TO RELATED APPLICATION

This application claims priority under 35 U.S.C. § 119 from German Patent Application No. 102021129695.1 dated Nov. 15, 2021, the entire disclosures of which is herein expressly incorporated by reference.

BACKGROUND

The disclosure concerns a centrifugal pump with a shaft sealing arrangement, wherein the arrangement has a rotating element and a stationary element which form a sealing gap for a lubricating film in a chamber.

A shaft seal is a seal which seals a centrifugal pump at the passage of the rotating pump shaft from the stationary pump housing, such that the leakage losses or the air coming from the outside is reduced to a specific amount and any wear on the sealing surfaces is as low as possible.

Axial face seals are a special design of shaft seal and have a sealing gap which usually stands perpendicular to the shaft axis. Shaft seals of this type are also known as axial or hydrodynamic face seals. Compared with other sealing systems, such axial face seals take up less space and simpler to maintain. They have proved suitable for sealing both at low and high pressures and circumferential speeds.

During operation, sealing surfaces which are pressed together by hydraulic and/or mechanical forces slide on one another. The two ultra-finely machined sliding surfaces of a rotating element and a stationary element of the axial face seal form a sealing gap between them with a usually liquid film of lubricant. The slight leakage in axial face seals usually escapes to the atmosphere.

DE 199 28 141 A1 describes a sealing arrangement in which a shaft is conducted through a housing of a centrifugal pump. The arrangement comprises a shaft sleeve with axial face seals having a rotating element and a stationary element, between which a sealing gap is arranged for a lubricant film.

In some application fields, centrifugal pumps are used for conveying hot water or heat transfer media. Therefore the temperature must be dissipated at least by a special housing arrangement for heat emission, arranged between the pump housing and the shaft seal, so far that for example an axial face seal can be used for shaft sealing.

Since the thermal—and usually also chemical—loads are high on delivery of hot water and heat transfer media, such centrifugal pumps require a particular choice of materials for media- and pressure-loaded components, such as housing, impeller and split rings, so as to be suitable for these high loads. The housing arrangement for heat emission, which serves as a spacer piece for temperature dissipation, is of particular importance.

Temperature-sensitive components, such as for example the shaft seal, are kept at a distance from the hot pump housing which usually comprises a spiral housing and housing cover. The aim is to keep the heat flow from the pump housing to the shaft seal chamber as low as possible. The shaft seal in such pumps frequently comprises an axial face seal.

EP 1 134 424 B1 discloses an assembly for receiving hot fluids, in particular a centrifugal pump for conveying hot fluids, wherein a shaft penetrates through a sealing chamber with at least one axial face seal arranged therein, a fluid-conductive connection exists between the assembly and the sealing chamber, and the fluid extracted from the assembly cools and flushes the axial face seal. The axial face seal is protected from excessive temperatures by means of a long spacer.

DE 10 2017 209 803 A1 describes a centrifugal pump for conveying hot media with at least one impeller which is arranged in a pump housing and connected to a drive via a shaft, wherein a housing arrangement for heat emission adjoins the pump housing, and the shaft is provided with at least one axial face seal arrangement and at least one bearing. The axial face seal arrangement is separated from the hot medium via a heat-blocking space.

Often however a large space with a long spacer is associated with structural disadvantages, or is not possible simply because of the installation space available. Furthermore, when particularly hot fluids are conveyed, it is not always possible to cool the shaft or axial face seal adequately by spacing alone.

SUMMARY

One object of the disclosure is to provide a centrifugal pump with a shaft sealing arrangement which is suitable for conveying hot fluids. The centrifugal pump should be structured as compactly as possible. In particular when used in centrifugal pumps, the arrangement must be distinguished by high reliability, a low leakage rate and a long service life. The centrifugal pump with a shaft sealing arrangement should also guarantee simple installation and be easily accessible for maintenance work. Furthermore, the centrifugal pump with a shaft sealing arrangement should be distinguished by minimal production costs.

This and other objects are achieved according to the disclosure by a centrifugal pump with a shaft sealing arrangement. Preferred variants are given in the auxiliary main claims, the dependent claims, the description and the drawings.

According to the disclosure, the centrifugal pump comprises a cooling insert which has a first region and a second region. The first region at least partially surrounds the rotating element and the second region at least partially delimits the chamber.

When the shaft sealing arrangement is configured in the form of an axial face seal, the rotating element may comprise a shaft protection sleeve. Shaft sleeves are rotationally fixedly connected to the shaft and may protect the shaft from wear.

The stationary element is preferably configured as a fixed counter-ring connected directly or indirectly to the housing. In a particularly favorable variant of the disclosure, the stationary element is configured as an L-shaped ring insert. Preferably, the stationary element of the axial face seal is fixed to the cooling insert.

Ideally, the cooling insert is configured as an insert which is simple to install and fills the space between the pressure cover of the pump housing and the shaft passage. Advantageously, the cooling insert is fixed to the pressure cover of the pump housing.

A cooling insert preferably comprises a volume through which a coolant can flow, wherein the heat absorption area, the flow guidance of the coolant and the volume through which it can flow, are optimized with respect to heat dissipation.

The cooling insert forms a chamber for the rotating and stationary elements of the shaft sealing arrangement. In particular, the second region of the cooling insert forms the chamber since it at least partially delimits the chamber. The delimitation is preferably formed by the inner wall of the second region of the cooling insert.

Ideally, the chamber is configured as a seal chamber or axial face seal chamber.

The first region of the cooling insert at least partially surrounds the rotating element. In a particularly preferred variant of the disclosure, the cooling insert almost completely surrounds the rotating element.

In an alternative variant, the cooling insert, in particular the first region of the cooling insert, completely surrounds the rotating element.

Preferably, the first region of the cooling insert has a cooling channel. An externally conveyed cooling medium can flow through this cooling channel in order to dissipate the heat emitted by the hot fluid sufficiently for the shaft sealing arrangement not to be harmed. Thus the reliability of the shaft sealing arrangement can be guaranteed and a long service life ensured.

In a particularly favorable variant of the disclosure, the cooling channel is configured as a cooling spiral. The cooling medium here preferably flows in turbulent fashion, and at the same time flows around the shaft sealing arrangement with optimally formed heat transfer area.

In a quite particularly advantageous variant of the disclosure, the cooling channel is formed as a helix structure. A helix structure is a helical, twisted spiral. The shape of the cooling channel promotes the formation of a turbulent flow of cooling medium, whereby the heat dissipation can be optimally structured.

Ideally, guide contours or geometries for generating turbulence may be arranged in the cooling channel. This guarantees in particular that a turbulent flow of the cooling medium is formed or improved, whereby the heat of the rotating element can be better dissipated. The guide contours for increasing or forming turbulence may be arranged arbitrarily in the cooling chamber. In a particularly favorable variant of the disclosure, the guide contours may be configured as webs with a swirl-inducing edge.

Preferably, a connecting channel, which may be configured as a supply and return channel, is arranged in the first region of the cooling insert. This may be geometrically adapted such that the cooling channel can be formed as large as possible in the installation space available.

Preferably, the supply and return channel opens for example in a slightly wider but flat rectangular channel on the outside in the direction of the outlet connector of the cooling insert. For this, ideally the end of the helical cooling channel transforms into a return channel by means of a rounded deflection.

For maintenance or decommissioning of the centrifugal pump, a drainage channel is arranged in the first region of the cooling channel. The drainage channel is preferably an extremely small channel at the lowest point of the cooling insert, via which the cooling insert can be completely drained of cooling medium. Ideally, the drainage channel opens into a small connector which can be tightly closed with a plug in order to prevent uncontrolled and undesired escape of cooling medium. Advantageously, the highest point of the cooling insert has a vent opening, via which complete drainage can be guaranteed.

Ideally, a supply connector and an outlet connector are arranged in the second region of the cooling insert, via which the cooling medium can be supplied and discharged. In a favorable variant of the disclosure, the connectors have an internal thread for connection of coolant lines. The connectors may alternatively be designed as weld-fitting ends.

In addition, a secondary cooling system is arranged in particular in the second region of the cooling insert for dissipating the friction heat from the axial face seal. The secondary cooling system preferably has a supply port and an outlet port.

In a particularly favorable variant of the disclosure, both the connectors and also the ports may be arranged opposite one another, wherein they are each offset by 90° to one another. The connectors and ports are here arranged offset by 90° to one another.

In an alternative variant of the disclosure, the ports have an internal thread for tightly screwing in screw fittings. These ports may alternatively be configured as weld-fitting ends.

In an extremely advantageous variant of the disclosure, the secondary cooling system is configured as a direct cooling system. Here the cooling medium flows via the supply port directly into the chamber which is formed by the second region of the cooling insert around the sealing gap of the axial face seal. The cooling medium can absorb the heat resulting from friction and flows out of the chamber via the outlet port.

Alternatively, the chamber around the axial face seal may be loaded with process medium via the gap between the shaft protection sleeve and the first region of the cooling insert. The process medium can absorb the heat resulting from friction and flows out of the chamber via the outlet port. The process medium heated by friction flows for example through an external cooler and is returned. The circulating process medium flows via the supply port directly into the chamber which is formed by the second region of the cooling insert around the sealing gap of the axial face seal.

In an alternative variant of the disclosure, the secondary cooling system is configured as an indirect cooling system. The chamber formed by the second region of the cooling insert contains a cooling spiral or cooling space. The cooling medium flows into the cooling spiral via the supply port and absorbs the heat which occurs or is present around the sealing gap, and discharges the heat from the chamber via an outlet port.

Advantageously, the cooling insert is configured as one piece. Thus the first region with the cooling channel and the second region with the secondary cooling system, the connectors and ports, is extremely compact. The one-piece design in particular allows simple and rapid installation and production, and has also proved particularly favorable for maintenance.

Previously, no cooling insert was known to have the described features. Ideally, the cooling insert is produced generatively. During generative or additive production, a cooling insert is formed with a complex shape adapted to the task of heat dissipation.

According to the disclosure, in the method for producing a cooling insert with a complex shape of the cooling channel, the cooling insert is produced by selective action of a radiant beam onto a construction material.

According to the disclosure, the cooling insert is produced additively. Only with this particular manufacturing technique can the cooling channel be designed complex and versatile, and be produced very quickly with extremely little use of material. In particular, the helix structure of the cooling channel with integrated guide contours for generating turbulence can only be produced using the additive manufacturing technique.

An additively manufactured cooling insert is produced with an additive manufacturing process. The term "additive manufacturing process" includes all production processes in which material is applied layer by layer and thus three-dimensional channels produced. The layer structure is created under computer control from one or more liquid or solid materials to predefined dimensions and shapes. During construction, physical or chemical hardening or melting processes take place. Typical materials for 3D printing are plastics, synthetic resins, ceramics, metals, carbon and graphite materials.

To form the cooling insert, in particular selective laser melting and cladding, also known as build-up welding, are used.

In selective laser melting, a cooling insert is produced with a cooling channel in the form of a cooling spiral, using a method in which firstly a layer of a construction material is applied to a substrate. Preferably, the construction material for production of the cooling insert comprises metal powder particles. In a variant of the disclosure, iron- and/or cobalt-containing powder particles are used. These may contain additives such as chromium, molybdenum or nickel. The metallic construction material is applied in powder form onto a plate in a thin layer. Then the powdery material is locally completely melted by a radiant beam at the desired points, and after hardening, a solid material layer is formed. Then the substrate is lowered by the amount of a layer thickness and further powder is applied. This cycle is repeated until all layers have been produced and the finished cooling insert created.

The radiant beam may for example be a laser beam which generates the cooling insert from the individual powder layers. The data for guidance of the laser beam are produced by software on the basis of a 3D CAD body. As an alternative to selective laser melting, an electron beam (EBN) may also be used.

During build-up welding or cladding, the cooling insert is produced using a method in which an initial piece is coated by welding. In build-up welding, a welding additive material in the form of a wire or powder is used to produce a volume which allows a particularly delicate and optimized shape of the cooling channel.

The different properties of the cooling insert with a helical cooling spiral are generated by variations in the radiant beam. By targeted control of local heat application, the material properties are modified even during construction. Thus zones and structures of different material states of a chemical homogenous material, and hence different properties, can be created in one region of the cooling insert.

In a variant of the disclosure, the cooling insert may be produced from different construction material. The construction material preferably comprises metallic powder particles.

The additive construction of the cooling insert allows particularly thin walls of the cooling channel and optimum use of the installation space available by varying cross-sections of the cooling channel in order to optimally form a heat transmission area which is as large as possible.

Ideally, the cooling insert is used for cooling shaft sealing arrangements which serve for conveying hot fluids, in particular hot water and also heat transfer media.

Further features and advantages of the disclosure arise from the description of exemplary embodiments with reference to the drawings, and the drawings themselves. In the drawings:

DETAILED DESCRIPTION

Figure 1:
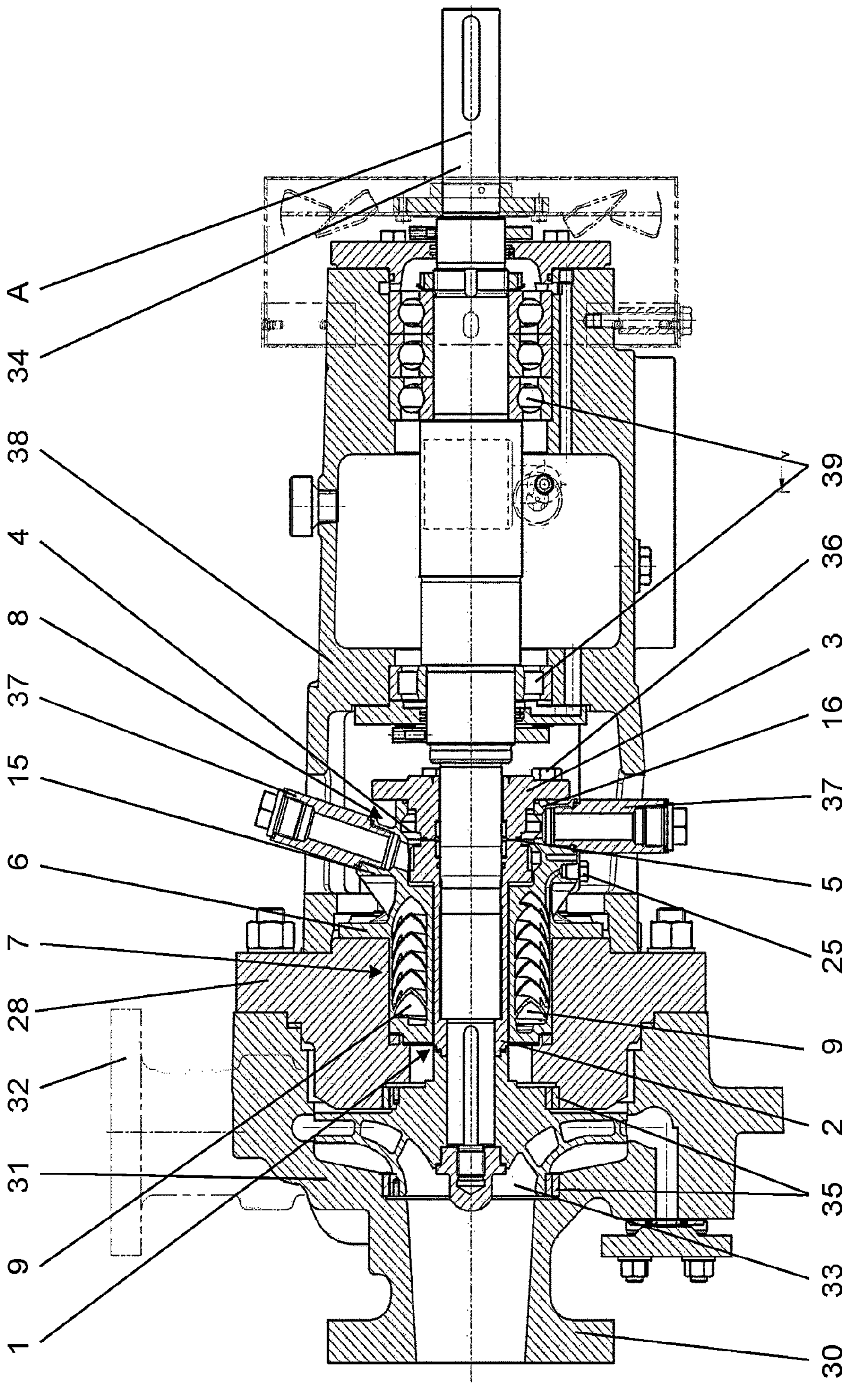
FIG. 1 shows a sectional illustration of a centrifugal pump with a cooling insert.

FIG. 1 shows a sectional illustration of a centrifugal pump with a cooling insert 6. The very hot fluid to be conveyed flows via the suction opening or suction connector 30 into the pump housing 31. The radial impeller 33, which loads the fluid with energy, sits rotationally fixedly on the pump shaft 34. The fluid leaves the centrifugal pump via the schematically indicated pressure connector 32.

The pressure cover 28 of the pump housing 31 surrounds the radial impeller 33, wherein the raceways and split rings 35 minimize the gap losses at the radial impeller 33 and pump housing 31 or housing cover 28.

The cooling insert 6 is arranged between the pump shaft 34 and the pressure cover 28, wherein a first region 7 of the cooling insert 6 at least partially surrounds a rotating element 2 of the shaft sealing arrangement 1. A second region 8 at least partially surrounds a stationary element 3.

The rotating element 2, illustrated in simplified form, in this embodiment comprises at least a shaft sleeve and a slide ring. The slide ring is connected to the shaft sleeve and rotates with the shaft 34 about the rotational axis A. The shaft protection sleeve may however also be present as a separate component and the rotating sealing unit mounted thereon.

The stationary element 3, also illustrated in simplified form, comprises at least one counter-ring.

The first rotating slide ring cooperates with the stationary counter-ring. One of the two slide rings is also axially displaceable and pretensioned in the direction of the other slide ring via for example a spring device.

The second region 8 of the cooling insert 6 forms a chamber 4, also called the axial face seal chamber, around a sealing gap 5 between the rotating element 2 and the stationary element 3. In this embodiment, the stationary element 3 is positioned and fixed on the cooling insert 6 by fixing means 36.

In this embodiment variant, as an axial face seal, a single-action component shaft seal is used which is based on silicon carbide for use in the hot water field.

In this embodiment variant, circulating process medium flows through the chamber 4, entering via the supply port 16 and exiting via the outlet port 15. Extension pieces 37 are screwed into the ports 15 and 16 by means of a threaded connection. The position and through-flow of the ports 15 and 16 may be adapted to the prevailing conditions. The extension pieces 37 in this embodiment protrude from the spacer 38, so connection to an external cooling circuit is simple. This external cooling system can dissipate friction heat from the axial face seal. The spacer 38 comprises the roller bearing 39 of the pump shaft 34.

In the first region 7 of the cooling insert 6, a cooling channel 9 is arranged which dissipates heat from the rotating element 2, the pump shaft 34 and the process medium present in the gap in-between; said heat stresses the shaft sealing arrangement 1 by thermal loading from the hot conveyed fluid.

Figure 2:
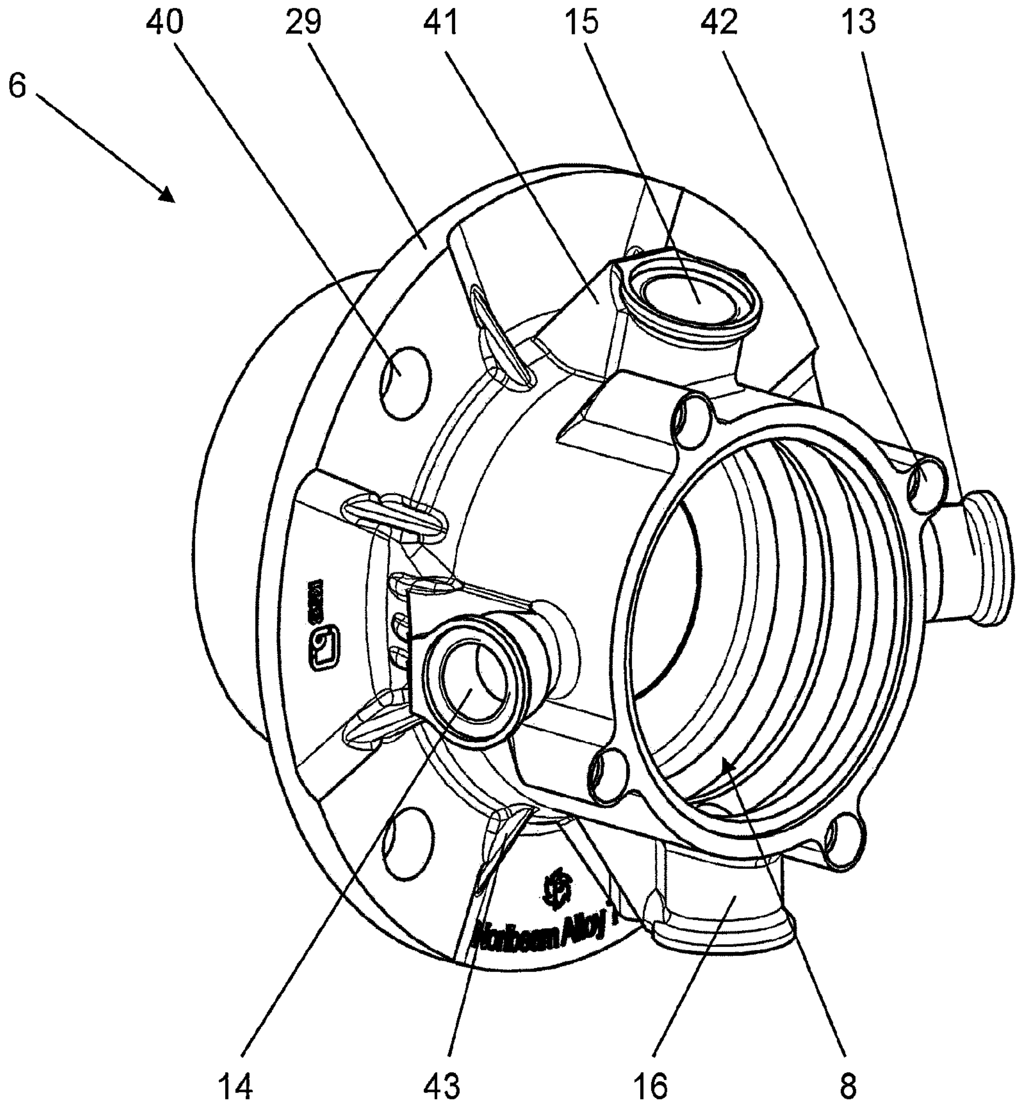
FIG. 2 shows a perspective illustration of the cooling insert.

FIG. 2 shows a perspective illustration of the cooling insert 6. The stop 29 lies on the pressure cover 28. In this embodiment variant of the disclosure, four screws are inserted through the bores 40 for fixing to the pressure cover 28. The stop 29 is strengthened with eight diagonal braces 43 which are each arranged offset to one another by around 45°.

The second region 8 of the cooling insert 6 contains a supply connector 13, an outlet connector 14, the supply port 16 and the outlet port 15, each arranged offset by 90° to one another. The connectors 13 and 14, and the ports 15 and 16, have a reinforcing shoulder or ribs 41 and an internal thread for tight fitting of extension pieces 37 and pipeline screw fittings.

Four screw receivers 42 with internal thread are arranged offset to one another by 90° and flush with the end of the second region 8 of the cooling insert 6. In this embodiment variant, the stationary element 3 of the shaft sealing arrangement 1 is fixed into the screw receivers 42 by means of screws.

Figure 3:
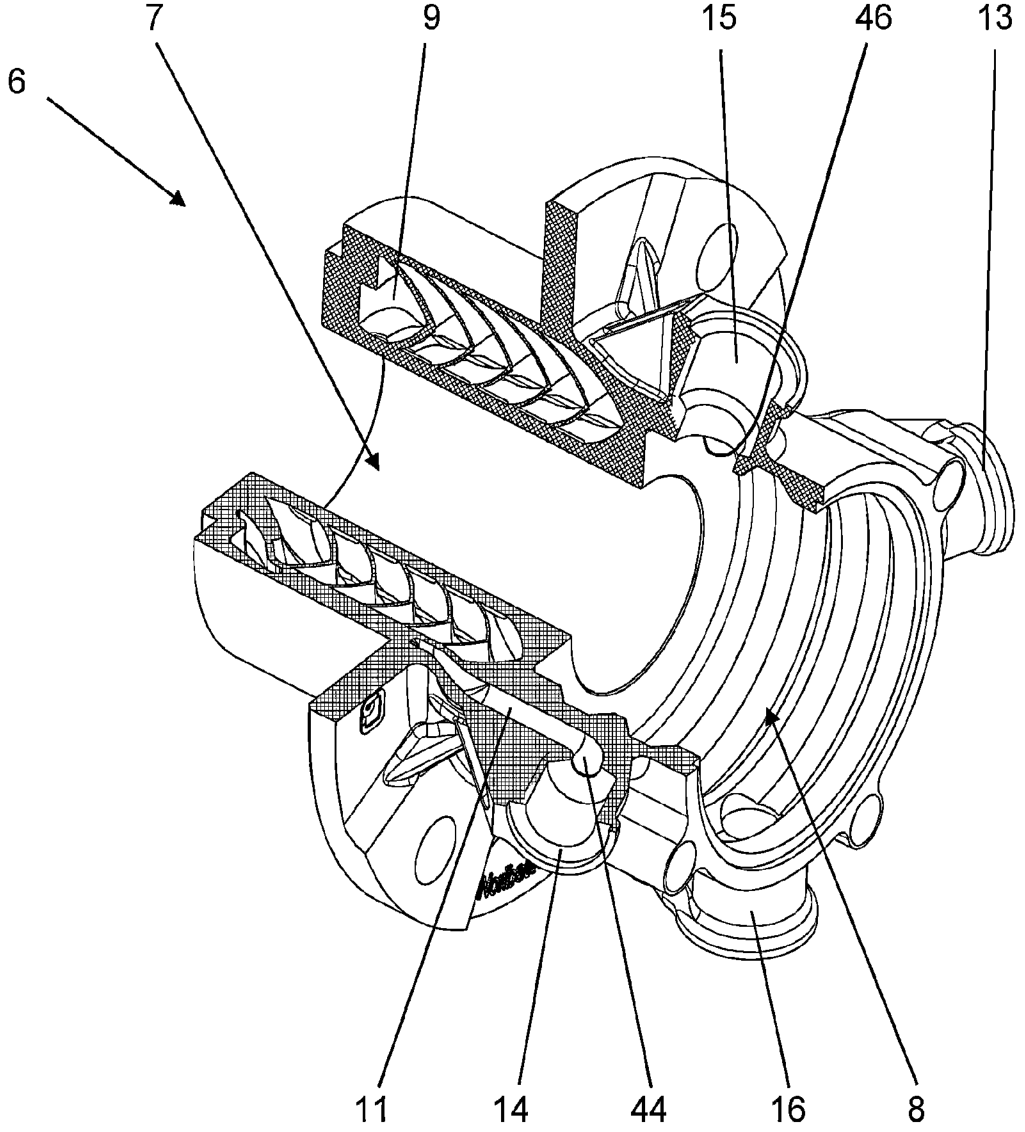
FIG. 3 shows a perspective, partially sectional illustration of the cooling insert.
Figure 4:
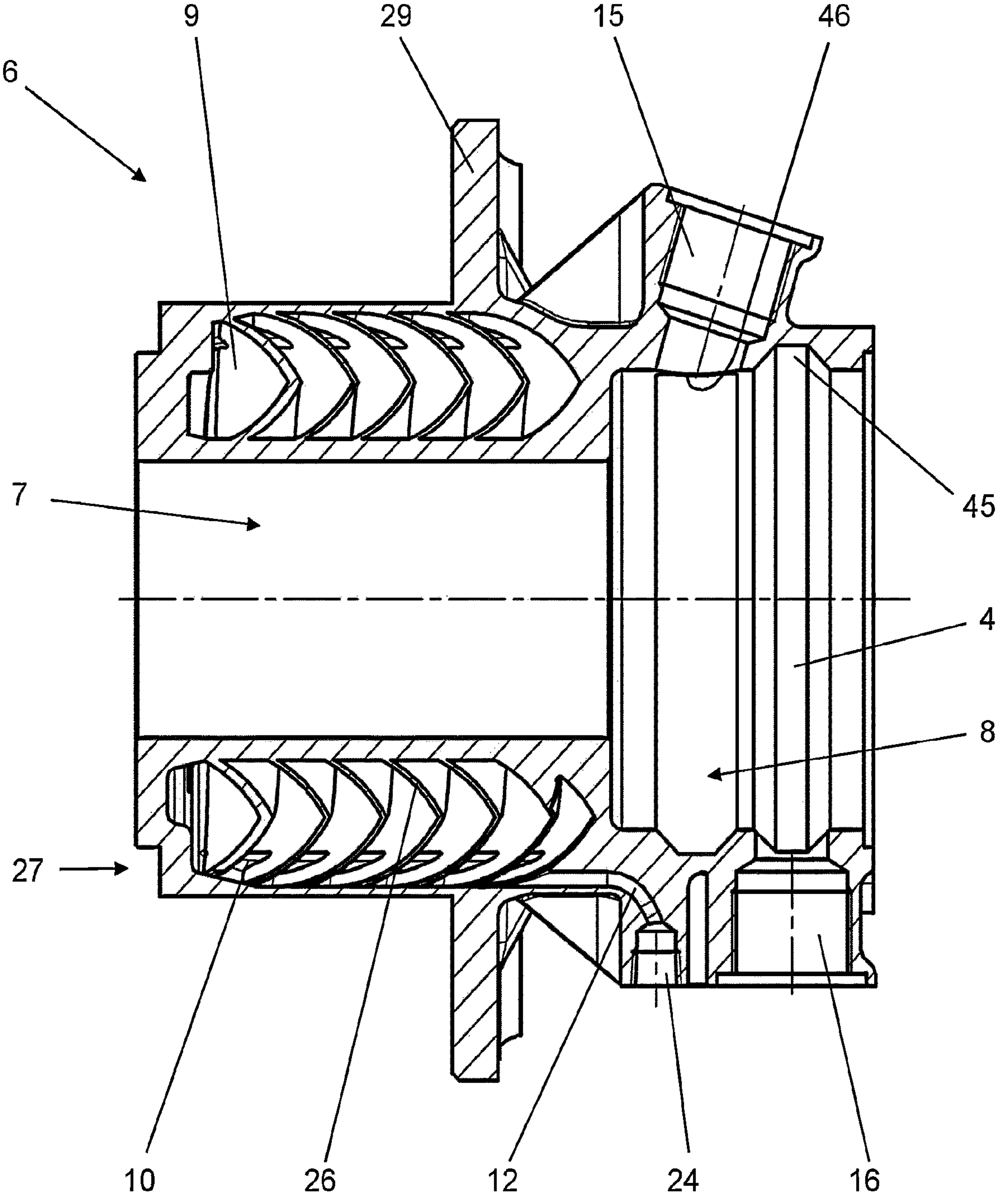
FIG. 4 shows a vertical sectional illustration of the cooling insert.
Figure 5:
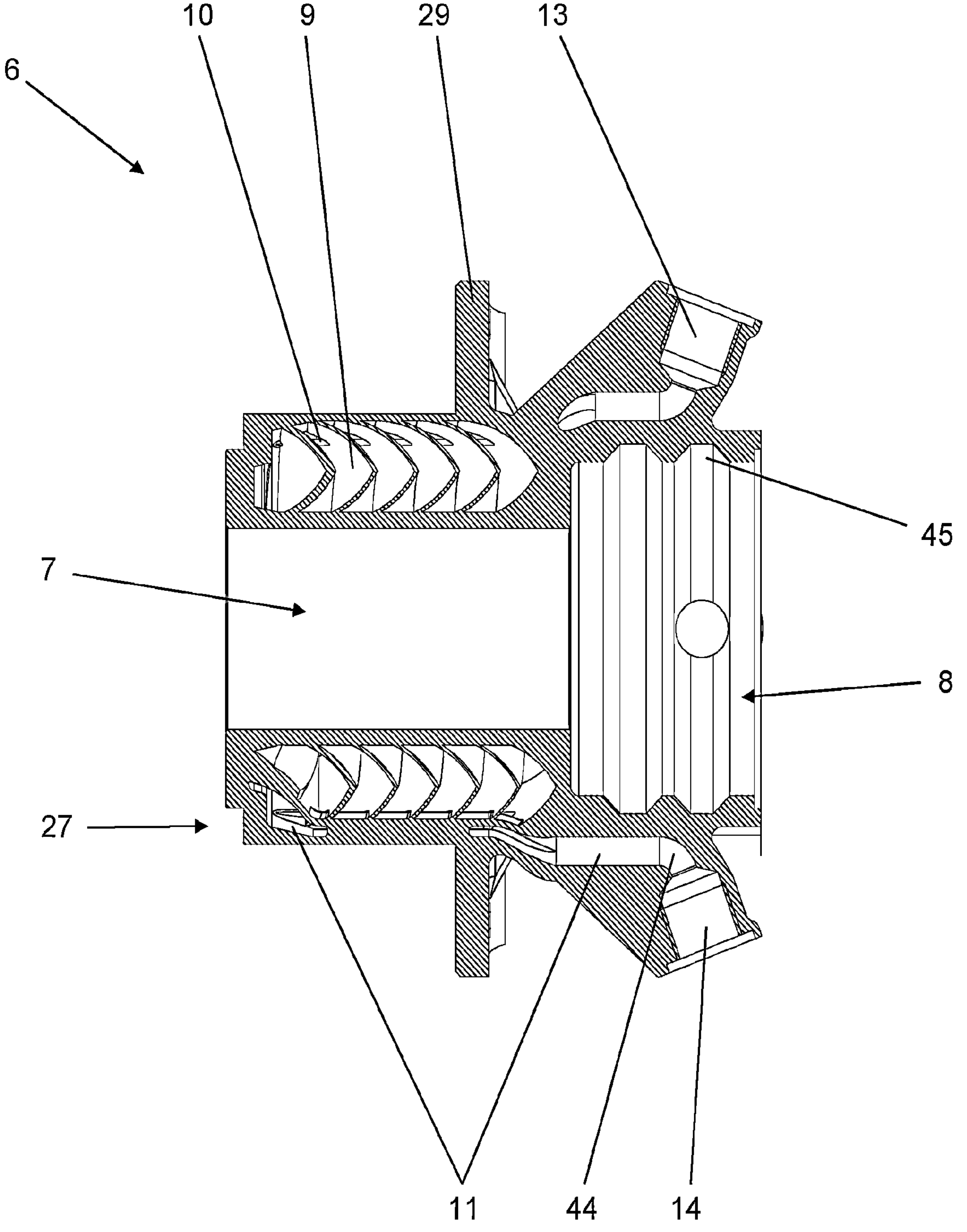
FIG. 5 shows a horizontal sectional illustration of the cooling channel.

FIG. 3 shows a perspective, partially sectional illustration of the cooling insert 6. FIG. 4 shows a vertical and FIG. 5 a horizontal section through the cooling insert 6. The first region 7 at least partially cylindrically surrounds the rotating element 2 (not shown in FIGS. 3 to 5) which is connected rotationally fixedly to the shaft. Cooling medium flows through the cooling channel 9 to dissipate heat.

The cooling medium is supplied to the cooling channel 9 in the second region 8 via the supply connector 13. The cooling channel 9 is configured in the fashion of a screw thread and in the illustration has six turns (the number of which may vary due to installation space), so that the cooling medium flows around the rotating element 2 before the cooling channel 9 opens into a return channel 11. The return channel 11 in turn opens into the outlet connector 14 via an angled elbow 44. The through-flow directions may be varied if the supply port 16 is used as a return and the return port 15 as a supply, or if the outlet connector 14 is used to supply the cooling medium to the cooling channel 9 and the supply connector 13 to discharge the cooling medium.

The secondary cooling system of the sealing gap 5 (not shown in the figures) is configured as a direct cooling system. The circulating process medium of the secondary cooling system flows into the chamber 4 via the supply port 16 and leaves the chamber 4 via the outlet port 15. The supply port 16 and outlet port 15 are arranged opposite and thus offset by 180° to one another in the second region 8 of the cooling insert 6. A build-up edge 46 in the region of the outlet port 15 in the sealing chamber 4 positively influences the flow deflection.

The cooling insert 6 is produced generatively and hence formed as one piece, wherein the cooling insert 6 has a particularly complex construction and a routing of the cooling channel 9 ideally adapted to the task of heat dissipation.

The cooling channel 9 has the cross-section of a curved triangle, leading to a particularly large heat transmission area. The individual turns of the cooling channel 9 are separated from one another by particularly thin webs 26 which have the shape of a gothic arch and are made from an advantageously heat-conductive material. Guide contours 10 are arranged in the cooling channel 9 and contribute to a flow turbulence of the cooling medium. The heat dissipation power of the cooling insert 6 is thereby significantly increased. The guide contours 10 in this variant are configured as webs which protrude into the flow chamber from the outer wall of the cooling channel 9 and have a swirl-inducing edge.

The cylindrical part of the first region 7 of the cooling insert 6 has a shoulder 27 which serves for fitting a seal in the pressure cover 28 of the centrifugal pump. This shoulder may also be worked onto the housing cover 28 in order to allow the fitting of a seal.

As shown in FIG. 4, a drainage channel 12, which opens into a drainage connector 24, runs at the lowest point of the cooling insert 6. The drainage channel 12 may have a slope in the direction of the drainage connector 24.

The second region 8 of the cooling insert 6 forms a chamber 4 around the rotating element 2 and the stationary element 3 of the shaft sealing arrangement 1. To receive the stationary element 3, which is inserted in the second region 8 of the cooling insert 6, the second region 8 has various chamfers and recesses 45. These serve to enlarge the fluid-filled chamber and guide the flow of the process medium in the chamber 4.

To be able to dissipate the friction heat occurring at the sealing gap 5 (shown in FIG. 1) of the shaft sealing arrangement 1, the cooling insert 6 in the second region 8 has a supply port 16 and an outlet port 15 for a secondary cooling system. In the embodiment variant of the disclosure shown, the secondary cooling system is configured as direct cooling system, so that via the supply port 16, the externally cooled and circulating process medium fills and flows through the chamber 4 around the sealing gap 5. The advantageous secondary cooling system guarantees a high reliability of the shaft sealing arrangement with simultaneously long service life. A build-up edge 46 may be arranged in this region 8 in order to improve the fluid outlet from the port 15.

Figure 6:
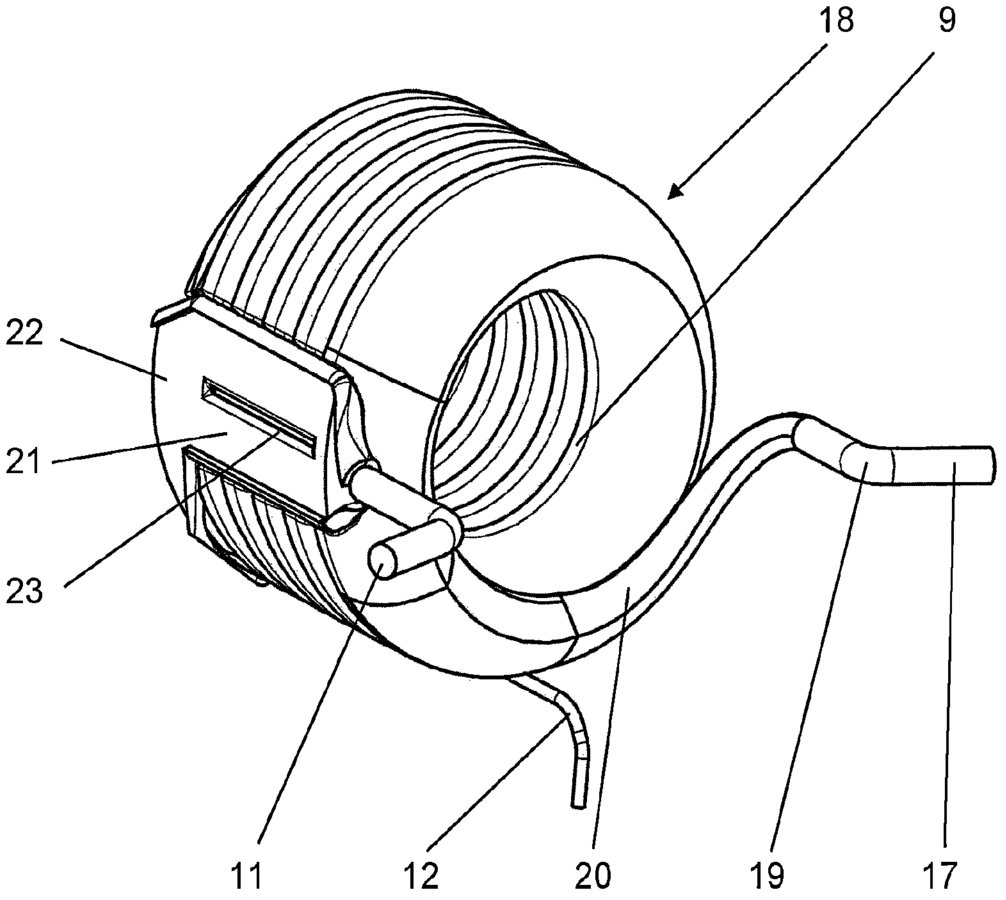
FIG. 6 shows an illustration of the wet volume of the cooling channel.

FIG. 6 shows a perspective illustration of the wet volume of the cooling channel 9 which, in the drawing, is shown without the remaining elements of the cooling channel 9 and cooling insert 6. The cooling medium flows through the supply connector 13 (not shown) into the supply channel 17. The supply channel 17 initially has a circular cross-section which, after an elbow 19, transforms into a transition piece 20. The transition piece 20 has a triangular cross-section, wherein the cross-sectional area increases continuously until the transition piece 20 opens into the cooling channel 9.

The cooling channel 9 is formed as a cooling spiral 18 in the form of a helical structure. The cooling spiral 18 is configured as a helical, twisted spiral which cylindrically connects around the rotating element 2 of the shaft sealing arrangement 1.

At the end of the cooling spiral 18, the cooling channel 9 opens into an almost rectangular return 21, wherein the transition is formed by means of a 90° elbow 22. The cooling spiral 18 has an opening in which the return 21 is inserted, and thus as a whole has a cylindrical form. An angular bulge 23 is formed in the return 21 for stabilization. The return 21 opens at the end of the cylindrical part of the cooling spiral 18 into the return channel 11, which in turn transforms into the outlet connector 14 (not shown).

The drainage channel 12 departs from the lowest point of the cooling channel 9 and has a circular cross-section which is significantly smaller than that of the cooling channel 9. The drainage channel 12 opens into the drainage connector 24 (not shown in this illustration) which can be tightly closed with a plug 25. For maintenance or decommissioning of the centrifugal pump, the cooling medium can be completely drained from the cooling insert 6 by means of the drainage channel 12.

The foregoing disclosure has been set forth merely to illustrate the disclosure and is not intended to be limiting. Since modifications of the disclosed embodiments incorporating the spirit and substance of the disclosure may occur to persons skilled in the art, the disclosure should be construed to include everything within the scope of the appended claims and equivalents thereof.

The invention claimed is:

1. A centrifugal pump comprising:

a shaft sealing arrangement, wherein the shaft sealing arrangement is a mechanical sealing arrangement and includes a rotating element and a stationary element, which form a sealing gap associated with a lubricating film in a chamber; and a cooling insert which has a first region and a second region, wherein the first region surrounds the rotating element and the second region at least partially delimits the chamber, and the first region has a cooling channel, and the cooling channel is a cooling spiral having a helical structure, which cylindrically connects around the rotating element of the shaft sealing arrangement, wherein the cooling channel has guide contours arranged therein, wherein the cooling insert is formed as one piece and is insertable into a pump housing as a single unit, the cooling channel is fully embedded within the cooling insert, and a drainage channel is arranged in the first region, wherein the drainage channel: i) departs from a lowest point of the cooling channel and i) opens into a connector having a plug.

2. The centrifugal pump as claimed in claim 1, further comprising: a connecting channel that is arranged in the first region.

3. The centrifugal pump as claimed in claim 2, wherein the drainage channel is configured to allow the cooling medium to be drained during maintenance of decommissioning.

4. The centrifugal pump as claimed in claim 3, further comprising: a supply connector and an outlet connector that are arranged in the second region, and which are configured to supply and discharge a cooling medium.

5. The centrifugal pump as claimed in claim 4, further comprising: a secondary cooling system that is arranged in the second region and that is configured to cool the region around the sealing gap, wherein the secondary cooling system has a supply port and an outlet port.

6. The centrifugal pump as claimed in claim 5, wherein the secondary cooling system is configured as a direct cooling system.

7. The centrifugal pump as claimed in claim 5, characterized in that the secondary cooling system is configured as an indirect cooling system.

8. The centrifugal pump as claimed in claim 7, wherein the cooling insert is produced generatively.

9. A method for producing a cooling insert as claimed in claim 8, wherein the cooling insert is produced by selective action of a radiant beam onto a construction material.

10. A cooling method comprising:

using the cooling insert as claimed in claim 8 for cooling a shaft sealing arrangement of a centrifugal pump for conveying hot fluids.

11. The centrifugal pump as claimed in claim 2, wherein the connecting channel is configured as a supply and return channel, the cooling channel opens into a return channel, and the return channel opens into an outlet connector via an angled elbow.

* * * * *